US012224099B2

(12) United States Patent
Kim

(10) Patent No.: US 12,224,099 B2
(45) Date of Patent: Feb. 11, 2025

(54) COIL COMPONENT

(71) Applicant: SAMSUNG ELECTRO-MECHANICS CO., LTD., Suwon-si (KR)

(72) Inventor: Jae Hun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 192 days.

(21) Appl. No.: 17/878,570

(22) Filed: Aug. 1, 2022

(65) Prior Publication Data

US 2022/0367103 A1 Nov. 17, 2022

Related U.S. Application Data

(63) Continuation of application No. 16/526,218, filed on Jul. 30, 2019, now Pat. No. 11,837,394.

(30) Foreign Application Priority Data

Mar. 15, 2019 (KR) ........................ 10-2019-0029770

(51) Int. Cl.
*H01F 27/29* (2006.01)
*H01F 27/02* (2006.01)
(Continued)

(52) U.S. Cl.
CPC ............. *H01F 27/28* (2013.01); *H01F 27/02* (2013.01); *H01F 27/24* (2013.01); *H01F 41/061* (2016.01)

(58) Field of Classification Search
CPC .......... H01F 27/28; H01F 27/02; H01F 27/24; H01F 41/061; H01F 27/324;
(Continued)

(56) References Cited

U.S. PATENT DOCUMENTS 7,078,988 B2 * 7/2006 Suzuki .................. H01F 41/082 336/83
8,710,947 B2 * 4/2014 Wada ...................... H01F 17/04 336/83
(Continued)

FOREIGN PATENT DOCUMENTS

CN 102428527 A 4/2012
CN 103928218 A 7/2014
(Continued)

OTHER PUBLICATIONS

U.S. Office Action dated Apr. 17, 2023 , issued in corresponding U.S. Appl. No. 16/526,218.
(Continued)

*Primary Examiner* — Mang Tin Bik Lian
(74) *Attorney, Agent, or Firm* — Morgan, Lewis & Bockius LLP

(57) ABSTRACT

A coil component may include a body having one surface and the other surface facing each other, and including a molded portion having a core and a cover portion disposed on the molded portion; a wound coil disposed between the molded portion and the cover portion and wound around the core; and a first accommodation groove and a second accommodation groove disposed on the one surface of the body to be spaced apart from each other, and respectively disposed outside of a region of the body corresponding to the core, wherein both end portions of the wound coil are respectively disposed in the first and second accommodation grooves, and a minimum value of a distance between the first and second accommodation grooves is greater than a diameter of the core.

14 Claims, 7 Drawing Sheets

(51) Int. Cl.

| | |
|---|---|
| ***H01F 27/24*** | (2006.01) |
| ***H01F 27/28*** | (2006.01) |
| ***H01F 41/061*** | (2016.01) |

(58) Field of Classification Search

CPC .. H01F 2017/048; H01F 17/04; H01F 27/292; H01F 27/29; H01F 27/306; H01F 27/2852; H01F 27/022; H01F 2027/297

See application file for complete search history.

(56) References Cited

U.S. PATENT DOCUMENTS

| | | | | |
|---|---|---|---|---|
| 8,723,629 | B1 | 5/2014 | Liu et al. | |
| 9,070,502 | B2 * | 6/2015 | Kitajima | H01F 17/0013 |
| 9,136,050 | B2 * | 9/2015 | Hsieh | H05K 3/301 |
| 9,336,941 | B1 | 5/2016 | Ikriannikov | |
| 2005/0212643 | A1 | 9/2005 | Kuroiwa et al. | |
| 2007/0216512 | A1 | 9/2007 | Sano et al. | |
| 2009/0058588 | A1 * | 3/2009 | Suzuki | H01F 27/292 336/192 |
| 2010/0176909 | A1 | 7/2010 | Yasuda et al. | |
| 2010/0277267 | A1 | 11/2010 | Bogert et al. | |
| 2010/0308950 | A1 | 12/2010 | Hsieh et al. | |
| 2012/0188040 | A1 | 7/2012 | Ogawa et al. | |
| 2014/0218157 | A1 | 8/2014 | Liu et al. | |
| 2016/0005520 | A1 | 1/2016 | CHeng | |
| 2016/0086725 | A1 * | 3/2016 | Igarashi | H01F 27/2823 336/83 |
| 2016/0141087 | A1 | 5/2016 | Liu et al. | |
| 2017/0229234 | A1 * | 8/2017 | Lee | H01F 27/28 |
| 2018/0211759 | A1 * | 7/2018 | Liu | H01F 1/14791 |
| 2018/0233282 | A1 * | 8/2018 | Tanaka | H01F 27/02 |
| 2018/0308609 | A1 | 10/2018 | Shinohara et al. | |
| 2018/0308610 | A1 * | 10/2018 | Ishida | H01F 27/292 |
| 2018/0308613 | A1 * | 10/2018 | Ishida | H01F 27/2852 |
| 2019/0066900 | A1 | 2/2019 | Nakajima et al. | |
| 2019/0088397 | A1 | 3/2019 | Ohtsubo | |
| 2020/0211763 | A1 * | 7/2020 | Kataoka | H01F 27/2828 |

FOREIGN PATENT DOCUMENTS

| | | | |
|---|---|---|---|
| EP | 0 939 412 | A2 | 9/1999 |
| JP | 2006-253394 | A | 9/2006 |
| JP | 2010-27758 | A | 2/2010 |
| JP | 2010-040707 | A | 2/2010 |
| KR | 10-1999-0073013 | A | 9/1999 |
| KR | 10-2009-0019559 | A | 2/2009 |
| KR | 10-2012-0085176 | A | 7/2012 |
| KR | 10-2016-0056594 | A | 5/2016 |
| TW | 434593 | B | 5/2001 |
| WO | 2015/005129 | A1 | 1/2015 |
| WO | 2017/170497 | A1 | 10/2017 |

OTHER PUBLICATIONS

U.S. Office Action dated Dec. 20, 2022 issued in corresponding U.S. Appl. No. 16/526,218.

Chinese Office Action dated Feb. 23, 2023, issued in corresponding Chinese Patent Application No. 201911000134.2 with English translation.

Office Action issued in corresponding Korean Patent Application No. 10-2019-0029770 issued Mar. 11, 2020, with English abstract.

* cited by examiner

COIL COMPONENT

CROSS-REFERENCE TO RELATED APPLICATION

This application is the continuation application of U.S. patent application Ser. No. 16/526,218 filed on Jul. 30, 2019, which claims the benefit of priority to Korean Patent Application No. 10-2019-0029770 filed on Mar. 15, 2019 in the Korean Intellectual Properly Office, the entire disclosure of which may be incorporated herein by reference.

TECHNICAL FIELD

The present disclosure relates to a coil component.

BACKGROUND

Magnetic molds and wound type coils may be used to manufacture coil components.

In order to install the coil components in a limited space, miniaturization and a low profile are required.

In order to improve the electrical characteristics (allowable current and DC resistance, etc.) of coil components, it is required to secure a relatively wide winding area. However, a conventional wound type coil component has a limitation in achieving miniaturization of the coil component due to the structure of the lead frame.

SUMMARY

An aspect of the present disclosure is to provide a coil component capable of being lighter, thinner, shorter, and smaller, and maintaining the characteristics of the component by securing the flux area.

According to an aspect of the present disclosure, a coil component includes a body having a first surface and a second surface facing each other, and including a molded portion having a core and a cover portion disposed on the molded portion; a wound coil disposed between the molded portion and the cover portion and wound around the core; and a first accommodation groove and a second accommodation groove formed on the first surface of the body and spaced apart from each other in a length direction of the body, and respectively disposed outside of a region of the body corresponding to the core, wherein both end portions of the wound coil are respectively disposed in the first and second accommodation grooves in the length direction, and a minimum distance between the first and second accommodation grooves is greater than a dimension of the core in the length direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
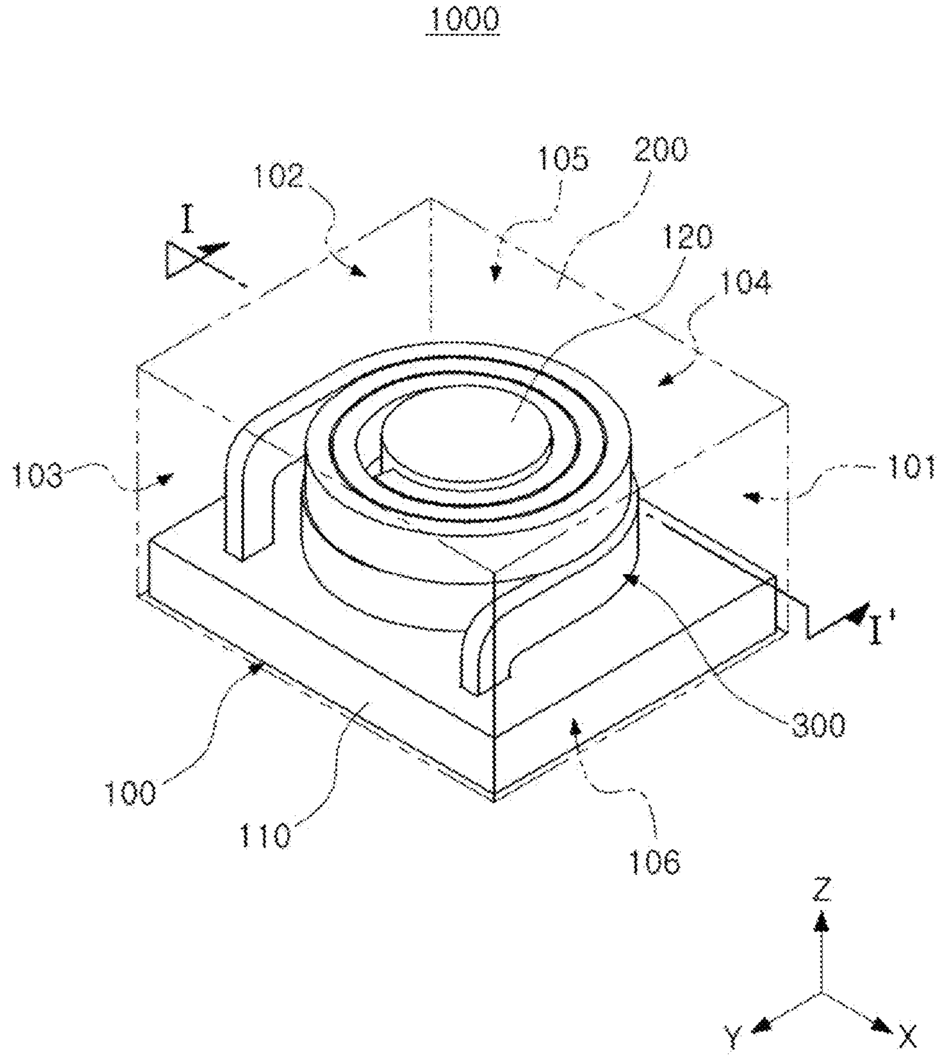
FIG. 1 is a schematic view illustrating a coil component according to a first embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an X direction is a first direction or a length direction, a Y direction is a second direction or a width direction, a Z direction is a third direction or a thickness direction.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power indicator, a high frequency (HF) indicator, a general bead, a high frequency (GHz) head, a common mode filter, and the like.

First Embodiment

Figure 2:
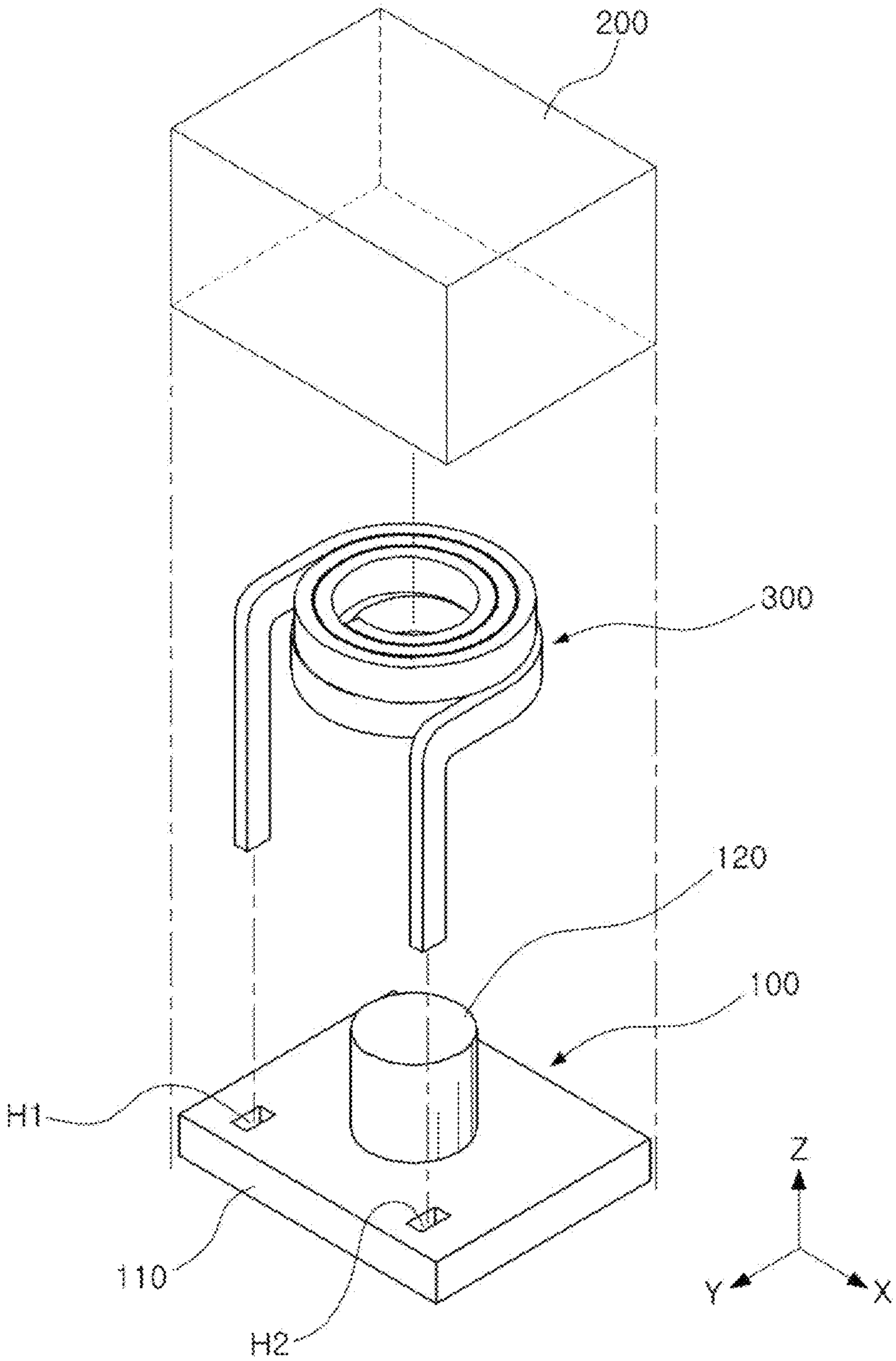
FIG. 2 is an exploded perspective view of FIG. 1.
Figure 3:
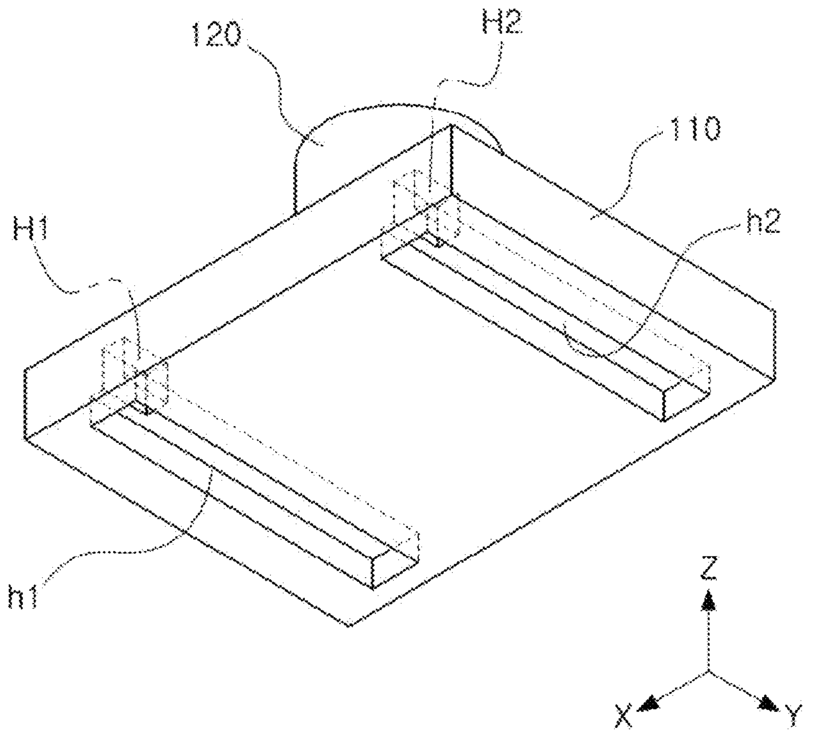
FIG. 3 is a perspective view of a molded portion of a coil component of FIG. 2, when viewed from below in an upward direction.
Figure 4A:
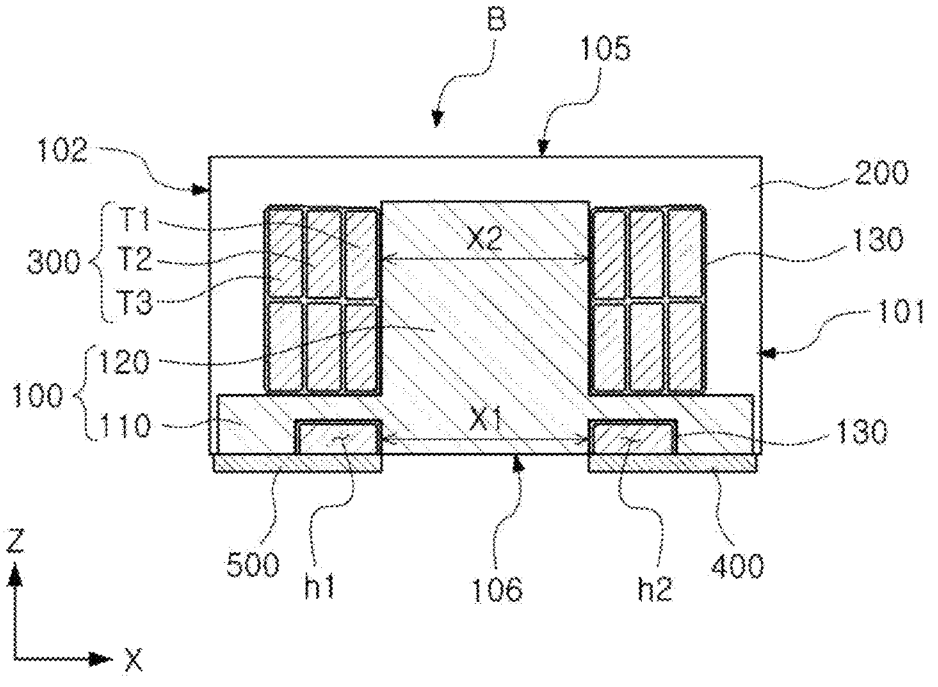
FIGS. 4A to 4C are views corresponding to cross-sections taken along line I-I' of FIG. 1.
Figure 4B:
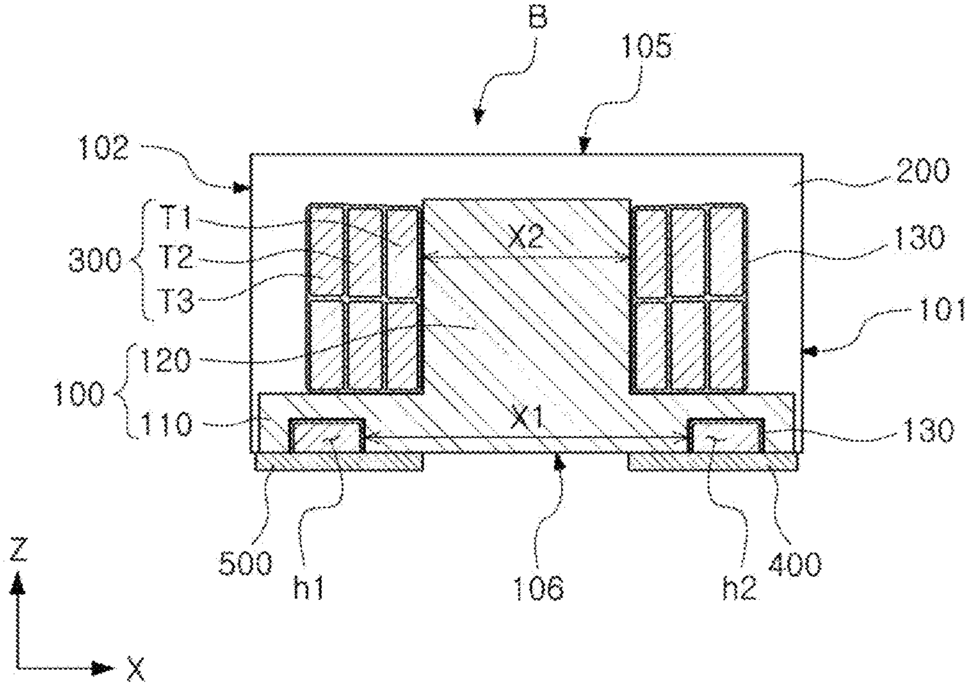
Figure 4C:
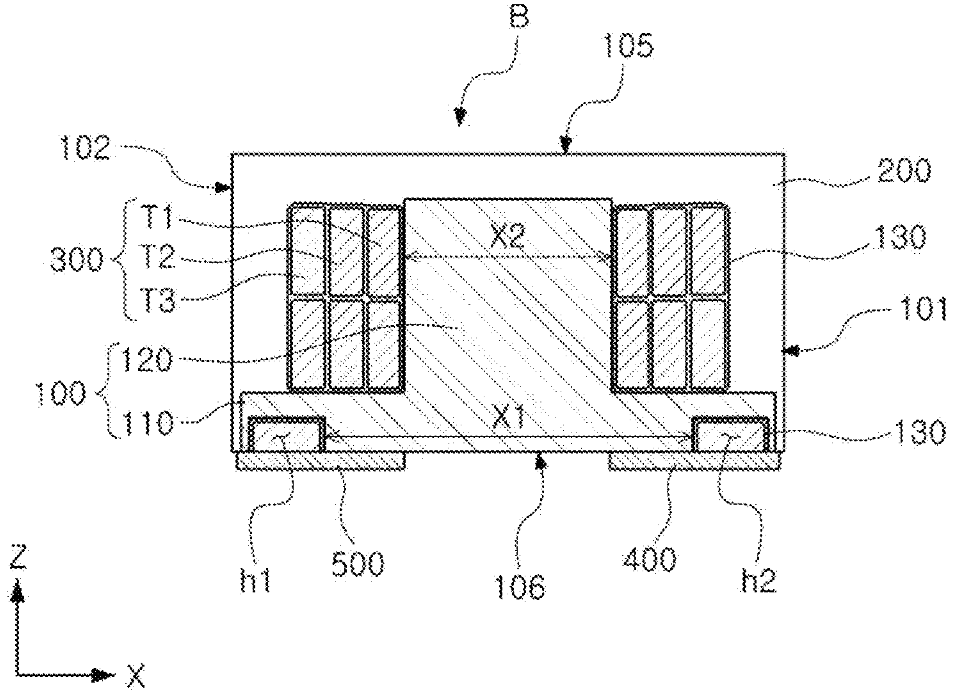
Figure 5:
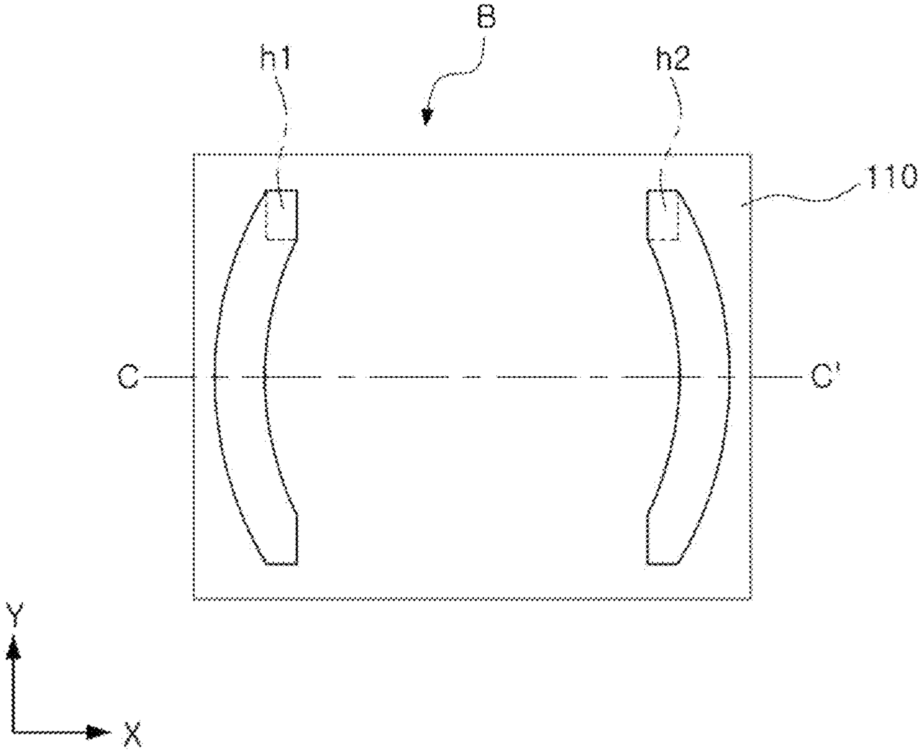
FIG. 5 is a view of a molded portion according to a modification of a first embodiment of the present disclosure, when viewed from below in an upward direction.
Figure 6:
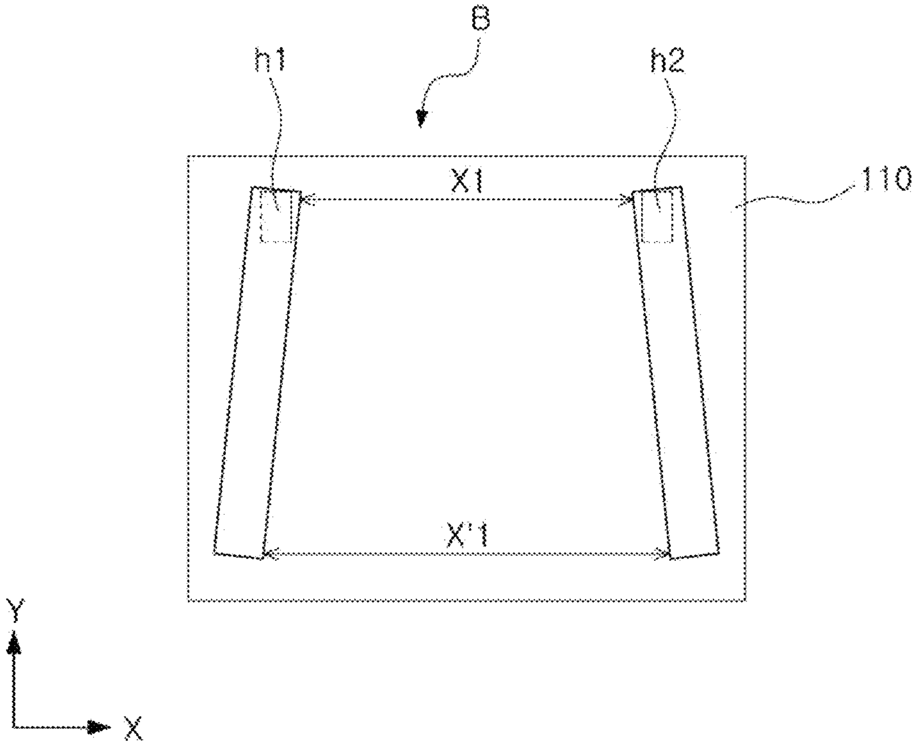
FIG. 6 is a view of a molded portion according to another modification of a first embodiment of the present disclosure, when viewed from below in an upward direction.

FIG. 1 is a schematic view illustrating a coil component according to a first embodiment of the present disclosure. FIG. 2 is an exploded perspective view of FIG. 1. FIG. 3 is a perspective view of a molded portion of a coil component of FIG. 2, when viewed from below in an upward direction. FIGS. 4A to 4C are views corresponding to cross-sections taken along line I-I' of FIG. 1. FIG. 5 is a view of a molded portion according to a modification of a first embodiment of the present disclosure, when viewed from below in an upward direction. FIG. 6 is a view of a molded portion according to another modification of a first embodiment of the present disclosure, when viewed from below in an upward direction.

Referring to FIGS. 1 to 6, a coil component 1000 according to a first embodiment of the present disclosure may include a body B, a wound coil 300, and accommodation grooves h1 and h2, and may further include external electrodes 400 and 500, and an insulation layer 130. The body B may include a molded portion 100 and a cover portion 200. The molded portion 100 may include a core 120.

The body B may form an exterior of the coil portion 1000 according to the present embodiment, and the wound coil 300 may be embedded therein.

The body B may be formed to have a hexahedral shape as a whole.

Referring to FIGS. 1 and 2, the body B may include a first surface 101 and a second surface 102 facing each other in a longitudinal direction X, a third surface 103 and a fourth surface 104 facing each other in a width direction Y, and a fifth surface 105 and a sixth surface 106 facing each other in a thickness direction Z. Each of the first to fourth surfaces 101, 102, 103, and 104 of the body B may correspond to wall surfaces of the body B connecting the fifth surface 105 and the sixth surface 106 of the body B. Hereinafter, both end surfaces of the body B may refer to the first surface 101 and the second surface 102 of the body B, and both side surfaces of the body B may refer to the third surface 103 and the fourth surface 104 of the body B.

The body B may be formed such that the coil component 1000 according to the present embodiment in which the external electrodes 400 and 500 to be described later are formed has a length of 2.0 mm, a width of 1.2 mm, and a thickness of 0.65 mm, but is not limited thereto.

The body B may include the molded portion 100 and the cover portion 200. The cover portion 200 may be disposed on the molded portion 100 with reference to FIG. 1 to surround the entire surface, except for a lower surface of the molded portion. Therefore, the first to fifth surfaces 101, 102, 103, 104, and 105 of the body B may be formed by the cover portion 200, and the sixth surface 106 of the body B may be formed by the molded portion 100 and the cover portion 200.

The molded portion 100 may have one surface and the other surface facing each other, and may include a support portion 110 and a core 120. The core 120 may be disposed in a central portion of the one surface of the support portion 110 through the wound coil 300. For the above reason, the one surface and the other surface of the molded portion 100 may be used in the same meaning as the one surface and the other surface of the support portion 110, respectively.

A thickness of the support portion 110 may be 200 μm or more. When the thickness of the support portion 110 is less than 200 μm, it may be difficult to ensure rigidity. A thickness of the core 120 may be 150 μm or more, but is not limited thereto.

The cover portion 200 may cover the molded portion 100, and a wound coil 300 to be described later. The cover portion 200 may be disposed on the support portion 110 and the core 120 of the molded portion 100, and the wound coil 300, and may be then pressed to be coupled to the molded portion 100.

At least one of the molded portion 100 and the cover portion 200 may include a magnetic material. In an embodiment of the present disclosure, both the molded portion 100 and the cover portion 200 may include a magnetic material. The molded portion 100 may be formed by filling magnetic material into a mold for forming the molded portion 100. Alternatively, the molded portion 100 may be formed by filling a mold with a composite material containing a magnetic material and an insulating resin.

The magnetic material may be a ferrite powder or a metal magnetic powder.

Examples of the ferrite powder may include at least one or more of spinel type ferrites such as Mn—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder may include at least one of iron (Fe), silicon (Si), chromium (Cr), cobalt (Co), molybdenum (Mo), aluminum (Al), niobium (Nb), copper (Cu), and nickel (Ni). For example, the metal magnetic powder may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metal magnetic powder may be amorphous or crystalline. For example, the metal magnetic powder may be a Fe—Si—B—Cr-based amorphous alloy powder, but is not limited thereto.

The ferrite powder and the metal magnetic powder may have an average diameter of about 0.1 μm to 30 μm, respectively, but are not limited thereto.

Each of the molded portion 100 and the cover portion 200 include two or more types of magnetic materials dispersed in the insulating resin. In this case, the term "different types of magnetic materials" means that magnetic materials dispersed in an insulating resin are distinguished from each other by an average diameter, a composition, crystallinity, and a shape.

The insulating resin may include an epoxy, a polyimide, a liquid crystal polymer, or the like, in a single form or in combined forms, but is not limited thereto.

The wound coil 300 may be embedded in the body B to exhibit the characteristics of the coil component 1000. For example, when the coil component 1000 of the present embodiment is used as a power indicator, the wound coil 300 may store an electric field as a magnetic field such that an output voltage may be maintained, thereby stabilizing power of an electronic device.

The wound coil 300 may be disposed between the molded portion 100 and the cover portion 200, for example, on the one surface of the molded portion 100. Specifically, the wound coil 300 may be wound around the core 120, and may be disposed on the one surface of the support portion 110.

The wound coil 300 may be an air-core coil, and may be composed of a rectangular coil. The wound coil 300 may be formed by spirally winding a metal wire such as a copper (Cu) wire of which surface is coated with an insulating material.

The wound coil 300 may be composed of a plurality of layers. Each layer of the wound coils 300 may be formed in a planar spiral shape, and may have a plurality of turns. For example, the wound coil 300 may form an innermost turn (T1), at least one intermediate turn (T2), and an outermost turn (T3), outward from the central portion of the one surface of the molded portion 100.

According to one exemplary embodiment of the present application, the wound coil 300 includes at least two stacks of coil turns in the thickness direction of the body B (e.g., Z-direction).

In magnetic flux distribution according to a position of each turn of the wound coil 300 in the body B, magnetic flux in the vicinity of the innermost turn (T1) adjacent to the core 120 may be more concentrated than that in the vicinity of the outermost turn (T3) farthest from the core 120. Therefore, in an embodiment of the present disclosure, as described later, a volume occupied by the magnetic material in the vicinity of the innermost turn (T1) may increase by making a distance (X1) between the accommodation grooves h1 and h2 in which the both end portions of the wound coil 300 longer than a dimension (or a diameter) (X2) of the core 120 in X-direction. As a result, the magnetic flux concentration phenomenon may be alleviated, and deterioration of the component characteristics such as deterioration of the inductance (Ls) may be prevented. Further, a magnetic flux concentrated region may be secured, without increasing the overall thickness of the coil component 1000, by controlling the distance (X1) between the accommodation grooves h1 and h2 in which the wound coils 300 are disposed.

The first and second accommodation grooves h1 and h2 may be formed on the one surface of the body B to be spaced apart from each other. The accommodation grooves h1 and h2 may be disposed outside of a region in the one surface of the body B, corresponding to the core 120. Positions of the first accommodation groove h1 and the second accommodation groove h2 are preferably located outside of the region in the one surface of the body B, corresponding to the core 120, to secure the magnetic flux area.

Each of the accommodation grooves h1 and h2 may be formed to extend on the one surface of the body B in the width direction of the body B. Since the body B in an embodiment of the present disclosure is a region including the molded portion 100 and the cover portion 200, the one surface of the body B may refer to one surface of a region including the molded portion 100 and the cover portion 200. Since the accommodation grooves h1 and h2 may be disposed on the one surface of the body B, the accommodation grooves h1 and h2 is not restricted to be disposed on the molded portion 100, and may be also disposed in the region in which the cover portion 200 is formed on the one surface of the body B. One end portion of the wound coil 300 may be disposed on the first accommodation groove h1, and the other end portion thereof max be disposed on the second accommodation groove h2, to be spaced apart from each other. Since the first and second accommodation grooves h1 and h2 may be regions in which the both ends of the coil 300 are led out to the external electrodes 400 and 500, the first and second accommodation grooves h1 and h2 may be formed on the one surface of the body B to be spaced apart from each other, to correspond to the first and second external electrodes 400 and 500, respectively.

Referring to FIGS. 1 and 2, according to one exemplary embodiment of the present disclosure, both end portions of the wound coil 300 bend toward the sixth surface 106 in a direction connecting the fifth and sixth surfaces 105 and 106 of body, and penetrating through the first and second accommodation grooves h1 and h2, respectively.

The both end portions of the wound coil 300 further bend toward one side surface (e.g., the fourth surface 104) of the body B, and extend onto the extending portions of the first and second accommodation grooves h1 and h2 in the width direction of the body B.

The both end portions of the wound coil 300 may be disposed in the first and second accommodation grooves h1 and h2, respectively, and a minimum value of the distance (X1) between the first and second accommodation grooves h1 and h2 may be smaller than a minimum value of the diameter (X2). A central portion and peripheral portion of the core 120 may correspond to a region to which the magnetic flux of the coil 300 affects, and the magnetic flux area needs to be sufficiently wide to improve the inductance of the coil component. The magnetic flux may be particularly concentrated in a region between the central portion of the core 120 and the end portion of the wound coil 300, disposed on the one surface of the body B, as the electronic component is downsized. This magnetic flux concentration may be alleviated, when the minimum value of the distance (X1) between the accommodation grooves h1 and h2 is greater than or equal to the diameter (X2) of the core 120.

Referring to FIG. 4A, in which the minimum value of the distance (X1) between the accommodation grooves h1 and h2 is equal to the diameter (X2) of the core 120, the innermost turn (T1) of the wound coil 300 and the end portions of the wound coils 300 may be located on the same line in the thickness direction of the body B. The concentration of magnetic flux in the region corresponding to the central portion of the core 120 may be alleviated on the one surface of the body B, as compared with a case in which the minimum value of the distance (X1) between the accommodation grooves h1 and h2 is smaller than the diameter of the core 120.

Referring to FIG. 4B, in which the minimum value of the distance (X1) between the accommodation grooves h1 and h2 is greater than the diameter (X2) of the core 120, the end portions of the wound coil 300 may be located outside of the innermost turn (T1) of the coil in the longitudinal direction of the body B. The concentration of magnetic flux in the region from the central portion of the core 120 to the end portions of the wound coil 300 may be alleviated, as compared with a case in which the minimum value of the distance (X1) between the accommodation grooves h1 and h2 is equal to the diameter (X2) of the core 120.

Referring to FIG. 4C, in which the minimum value of the distance (X1) between the accommodation grooves h1 and h2 is greater than the diameter (X2) of the core 120, the end portions of the wound coil 300 may be located in the body B. Although it is not illustrated in detail, it is preferable that the accommodation grooves h1 and h2 are disposed up to one region of the molded portion 100 in the longitudinal direction of the body. Therefore, as illustrated in FIG. 4C, the accommodation grooves h1 and h2 may be spaced apart from each other on an outermost side of the molded portion 100 in the longitudinal direction of the body B, but is not limited thereto. Since the area of the magnetic flux corresponding to the area from the one surface of the molded portion 100 to the other surface of the molded portion 100 may be further secured, as compared to those of FIG. 4B, the concentration of magnetic flux in the region from the central portion of the core 120 to the end portions of the wound coil 300 may be alleviated.

Each of the first and second accommodation grooves h1 and h2 may be formed to extend on the one surface of the body B in the width direction of the body.

Referring to FIG. 5, a distance (X10) between first and second accommodation grooves h1 and h2 may have a maximum value in a central portion C-C' of a body B in a width direction. End portions of a wound coil 300 disposed in the accommodation grooves h1 and h2 may be arranged in a curved shape, or an arc shape, by processing the accommodation grooves h1 and h2 into a curved shape on one surface of the body B. As an example for making the distance (X1) between the first and second accommodation grooves h1 and h2 be the maximum value in the central portion C-C' of the body B in the width direction, shapes of the accommodation grooves h1 and h2, and the end portions of the wound coil may be arranged as curved lines. A center portion of the arc shape of each of the first and second accommodation grooves h1 and h2 is bulging outwardly from a center point of the sixth surface 106 of the body B.

Referring to FIG. 6, a distance (X1) between first and second accommodation grooves h1 and h2 at one end of a body B in a width direction may be different from a distance X'1 between the accommodation grooves h1 and h2 at the other end of the body B in a width direction. The distance (X1) between the first and second accommodation grooves h1 and h2 may increase, from the one end of the body B in the width direction to the other end of the body in the width direction. The distance (X1) between the first and second accommodation grooves h1 and h2 may be different from the distance X'1 between the first and second accommodation grooves h1 and h2, at the other end in the width direction of the body B, but the different degrees are not limited thereto. The minimum value of the distance (X1) between the first and second accommodation grooves h1 and h2 is preferably greater than or equal to the diameter (X2) of the core 120, to secure the magnetic flux concentration region of the core 120.

The accommodation grooves h1 and h2 may be formed in an operation of forming the molding portion. When the accommodation grooves h1 and h2 are formed by filling a magnetic material in a mold for forming the molded portion 100, a pair of through-holes H1 and H2 passing through the support portion 110 may be formed, and the both end portions of the wound coil 300 may be disposed in the respective through-holes H1 and H2. For example, referring to FIG. 3, the through-holes H1 and H2 and the accommodation grooves H1 and H2 may be integrally formed, and the through-holes H1 and H2 and the accommodation grooves h1 and h2 may be disposed in the molded portion 100.

The both end portions of the wound coil 300 may be exposed to the other surface of the support 110, for example, the sixth surface 106 of the body B. The both end portions of the wound coil 300 exposed to the other surface of the support portion 110 may be disposed in the accommodation grooves h1 and h2 formed on one surface of the body B to be spaced apart from each other.

For example, the both end portions of the wound coil 300 may pass through the support 110 of the molded portion 100 to be exposed to the other surface of the support 110. Although not illustrated in detail, since the thickness of the both end portions of the wound coil 300 is equal to the thickness of the wound coil 300, it may protrude from the other surface of the support portion 110, as thick as it corresponds to the thickness of the wound coil 300. Since the protruded end portions may be polished together in the process of polishing an opening of a plating resist for forming the external electrodes 400 and 500 to be described later, the end portions of the wound coils 300 exposed to the other surface of the support portion 110 may be substantially thinner than the wound coil 300.

The external electrodes 400 and 500 may be spaced apart from each other on the one surface of the body B, for example, on the sixth surface 106. Specifically, they may be arranged on the other surface of the support 110 to be spaced apart from each other, and may be connected to the both end portions of the wound coil 300, respectively, to be integrally formed.

The external electrodes 400 and 500 may be formed a single-layer structure or a multiplayer structure. For example, the external electrodes 400 and 500 may be formed of a first layer comprising copper (Cu), a second layer disposed on the first layer and comprising nickel (Ni), and a third layer disposed on the second layer and comprising tin (Sn). The external electrodes 400 and 500 may be formed by an electrolytic plating process, but is not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but is not limited thereto.

Although not illustrated in the drawings, the coil component 1000 according to the present embodiment may further include an insulation layer 130 surrounding a surface of the wound coil 300. The insulation layer 130 may be disposed on the sixth surface 106 of the body B, except for a region in which the external electrodes 400 and 500 are disposed. The insulation layer 130 may be used as a plating resist in forming the external electrodes 400 and 500 by an electrolytic plating process, but is not limited thereto. The insulation layer 130 may be disposed on at least a portion of the first to fifth surfaces 101, 102, 103, 104, and 105 of the body B.

Second Embodiment

Figure 7:
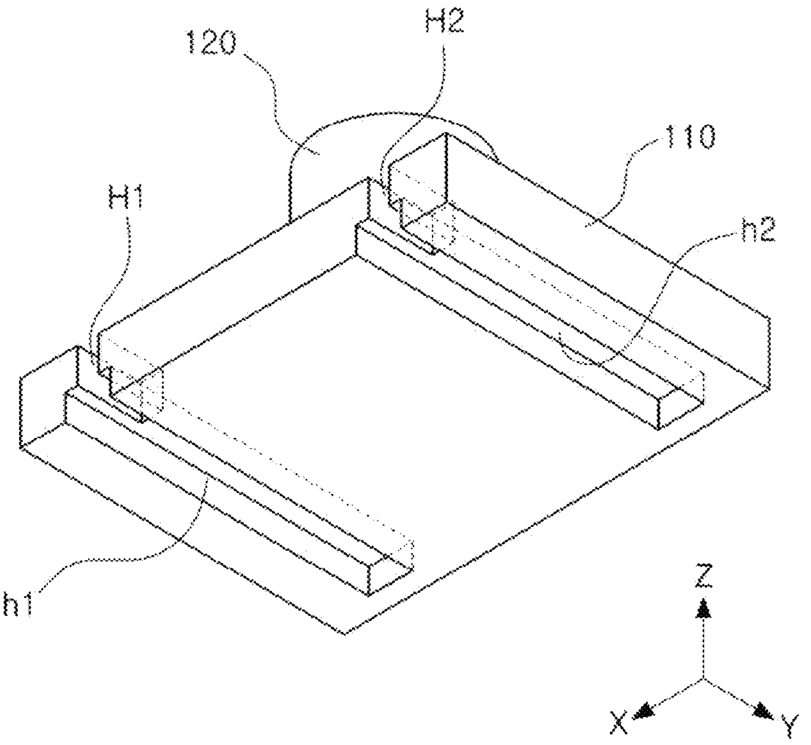
FIG. 7 is a perspective view of a molded portion applied to a coil component according to a second embodiment of the present disclosure, when viewed from below in an upward direction.

FIG. 7 is a perspective view of a molded portion applied to a coil component according to a second embodiment of the present disclosure, when viewed from below in an upward direction.

Referring to FIGS. 1 to 6, a coil component according to the present embodiment differs from the coil component according to the first embodiment of the present disclosure, in view of the arrangement of the accommodation grooves h1 and h2. Therefore, in describing the present embodiment, only an arrangement of accommodation grooves h1 and h2, different from those of the first embodiment, will be described. The remaining configuration of the present embodiment may be applied, as described in the first embodiment of the present disclosure.

Both end portions of a wound coil 300 may be respectively disposed in first and second accommodation grooves h1 and h2 through a side surface of a molded portion 100.

Referring to FIG. 7, through-holes H1 and H2 may be formed on one side surface of a molded portion 100. Accommodation grooves h1 and h2 formed on the one side surface of the molded portion 100 may extend to the one side surface of the molded portion 100, to be connected to the through-holes H1 and H2 formed on the one side surface of the molded portion 100. Referring to FIG. 7, widths of the accommodation grooves h1 and h2 are illustrated as being wider than widths of the through-holes H1 and H2. Since the end portions of the wound coils 300 are not limited to being arranged in the accommodation grooves h1 and h2, the width of the accommodation grooves h1 and h2 may be also equal to the width of the through-holes H1 and H2.

Referring to FIG. 7, according to one exemplary embodiment of the present disclosure, each of the first and second accommodation grooves h1 and h2 are opened to one side surface 103 of the molded portion 100.

The accommodation grooves h1 and h2 and the through-holes H1 and H2 may be formed in the molded portion 100 in operations of stacking and pressing a magnetic sheet containing a magnetic material on the molded portion 100. For example, the both end portions of the coil 300 protruding from the side surface and one surface of the molded portion 100 may be embedded inside of the molded portion 100 in the operation of pressing the magnetic sheet. Alternatively, as described above, the accommodation grooves h1 and h2 and the through-holes H1 and H2 may be formed in an operation of forming the molded portion 100 using a mold. In this case, protrusions corresponding to the accommodation grooves h1 and h2 and the through-holes H1 and H2 may be formed in a mold used for forming the molded portion 100.

Third Embodiment

Figure 8A:
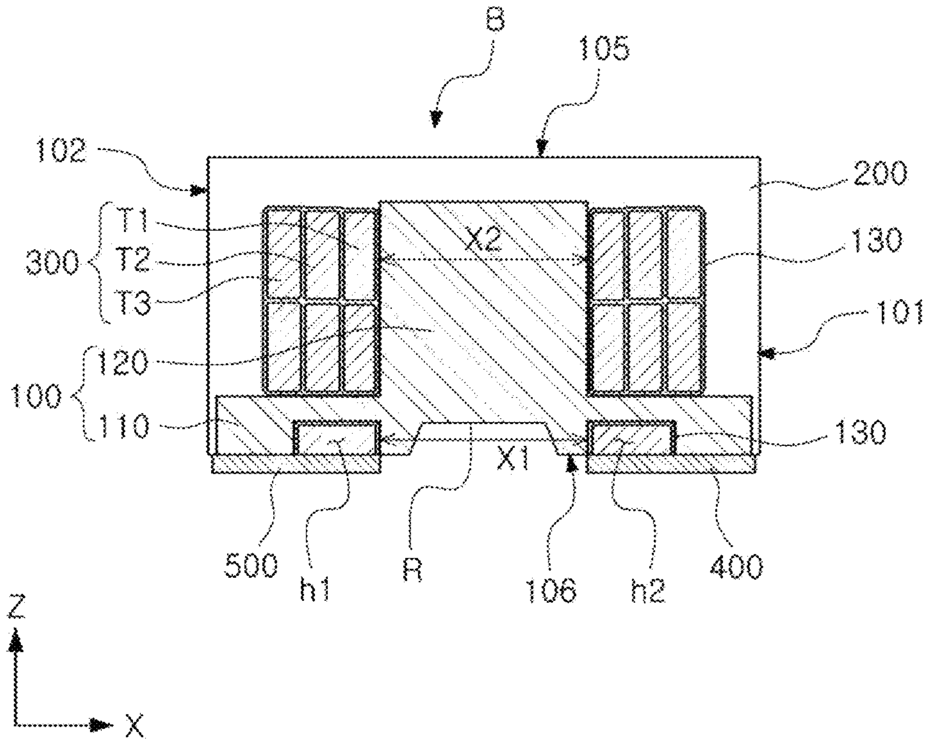
FIG. 8A to 8C are views illustrating a wound coil applied to a third embodiment of the present disclosure, and corresponding to cross-sections taken along line I-I' of FIG. 1.
Figure 8B:
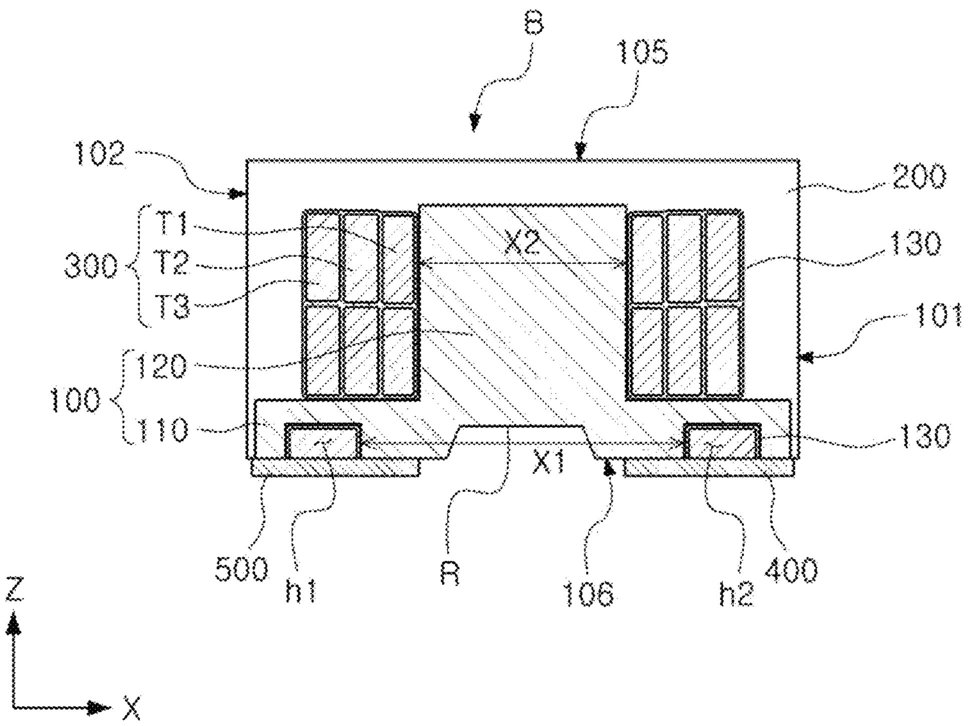
Figure 8C:
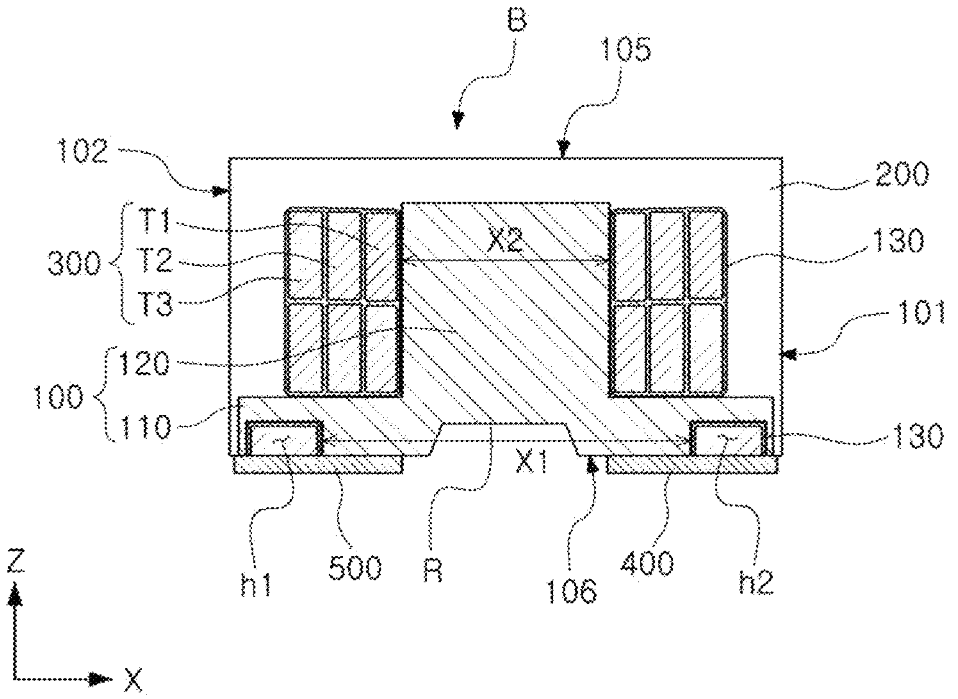

FIG. 8A to 8C are views illustrating a wound coil applied to a third embodiment of the present disclosure, and corresponding to cross-sections taken along line I-I' of FIG. 10.

Referring to FIGS. 1 to 7, a coil component according to the present embodiment may differ from the coil component according to the first and second embodiments of the present disclosure in view of the shape of the other surface of the molded portion 100. Therefore, only the shape of the other surface of the molded portion 100 different from that of the first embodiment will be described in describing the present embodiment. The remaining configurations of the present embodiment may be applied as they are in the first and second embodiments of the present disclosure.

A groove portion R may be formed between first and second external electrodes 400 and 500 on the other surface of the molded portion 100, for example, the other surface of support portion 110.

The groove portion R may prevent unnecessary removal of the plating resist necessary for forming the external electrodes 400 and 500 by electrolytic plating. For example, a plating resist, including an opening corresponding to a region in which the external electrodes 400 and 500 are formed, may be formed on a sixth surface 106 of the body B, to plate the external electrodes 400 and 500. When the opening is formed by a polishing process or the like, a region other than the region in which the external electrodes 400 and 500 are formed may be removed, and the groove portion R may be formed to prevent this. For the reason described above, an insulation layer such as a plating resist may be disposed in the groove portion R.

In this manner, according to the present embodiment, when the external electrodes 400 and 500 are formed by electrolytic plating, plating blur and the like may be prevented.

According to the present disclosure, a coil component capable of becoming lighter, thinner, shorter, and smaller, and maintaining the characteristics of the component by securing the flux area may be provided.

While example embodiments have been illustrated and described above, it will be apparent to those skilled in the art that modifications and variations could be made without departing from the scope of the present disclosure as defined by the appended claims.

What is claimed is:

1. A coil component comprising:

a body having a first surface and a second surface facing each other, the body including a molded portion having a core and a cover portion disposed on the molded portion;

a wound coil wound around the core: and a first accommodation groove and a second accommodation groove formed in the first surface of the body and spaced apart from each other in a first direction of the body, wherein first and second end portions of the wound coil are respectively disposed in the first and second accommodation grooves, a minimum distance between the first and second accommodation grooves in the first direction is greater than a dimension of the core in the first direction, and a distance from one region of the first end portion of the wound coil to the second end portion of the wound coil in the first direction is different from a distance from another region of the first end portion of the wound coil to the second end portion of the wound coil in the first direction.

2. The coil component according to claim 1, each of the first and second end portions of the wound coil penetrate through the molded portion via a pair of through-holes.

3. The coil component according to claim 2, wherein the first and second end portions of the wound coil are disposed in the first and second accommodation grooves through side surfaces of the molded portion, respectively.

4. The coil component according to claim 1, wherein each of the first and second end portions of the wound coil extend to a side surface of the molded portion to be respectively disposed in the first and second accommodation grooves.

5. The coil component according to claim 1, wherein each of the first and second accommodation grooves has a shape extending on the first surface of the body in a second direction, perpendicular to the first direction.

6. The coil component according to claim 1, wherein the distance from one region of the first accommodation groove to the second accommodation groove in the first direction increases, from one end to another end of the body in a second direction perpendicular to the first direction.

7. The coil component according to claim 1, wherein the wound coil has an innermost turn adjacent to the core, at least one intermediate turn, and an outermost turn, wherein a width and thickness of the innermost turn are equal to a width and thickness of the outermost turn, respectively.

8. The coil component according to claim 1, further comprising a first external electrode and a second external electrode, disposed on the body and respectively connected to the first and second end portions of the wound coil.

9. The coil component according to claim 8, further comprising an insulation layer surrounding a surface of the wound coil, wherein the insulation layer is disposed on the surface of the wound coil, except for regions in which the external electrodes are disposed.

10. The coil component according to claim 1, wherein at least one of the molded portion and the cover portion comprise a magnetic powder particle.

11. The coil component according to claim 10, wherein the magnetic powder particle has an average diameter of 0.1 μm to 30 μm.

12. The coil component according to claim 10, wherein the magnetic powder particle includes at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

13. The coil component according to claim 1, further comprising a groove portion formed between the first and second accommodation grooves on the first surface of the body, wherein the groove portion is spaced apart from the first and second accommodation grooves.

14. The coil component according to claim 13, wherein a width of the groove portion decreases in a direction from the first surface to the second surface of the body.

* * * * *